(12) United States Patent
Malik

(10) Patent No.: US 10,595,093 B2
(45) Date of Patent: Mar. 17, 2020

(54) APPARATUS AND METHOD FOR PRESENTING AN ELECTRONIC PROGRAMMING GUIDE

(71) Applicant: AT&T INTELLECTUAL PROPERTY I, LP, Atlanta, GA (US)

(72) Inventor: Dale Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 88 days.

(21) Appl. No.: 15/093,830

(22) Filed: Apr. 8, 2016

(65) Prior Publication Data

US 2016/0227290 A1 Aug. 4, 2016

Related U.S. Application Data

(63) Continuation of application No. 12/174,927, filed on Jul. 17, 2008, now Pat. No. 9,338,407.

(51) Int. Cl.
| | |
|---|---|
| *H04N 21/482* | (2011.01) |
| *H04N 5/445* | (2011.01) |
| *H04N 21/254* | (2011.01) |
| *H04N 21/442* | (2011.01) |
| *H04N 21/45* | (2011.01) |

(Continued)

(52) U.S. Cl.
CPC ..... *H04N 21/4821* (2013.01); *H04N 5/44543* (2013.01); *H04N 7/17318* (2013.01); *H04N 21/251* (2013.01); *H04N 21/254* (2013.01); *H04N 21/25891* (2013.01); *H04N 21/26283* (2013.01); *H04N 21/4147* (2013.01); *H04N 21/44204* (2013.01); *H04N 21/44222* (2013.01); *H04N 21/4532* (2013.01); *H04N 21/4667* (2013.01); *H04N 21/482* (2013.01); *H04N 21/4828* (2013.01); *H04N 21/84* (2013.01)

(58) Field of Classification Search
CPC ........... H04N 21/2668; H04N 21/4667; H04N 21/44204; H04N 21/44222; H04N 21/251; H04N 21/254; H04N 21/25891; H04N 21/26283; H04N 21/4147; H04N 21/4532; H04N 21/482; H04N 21/4821; H04N 21/4828; H04N 21/84
USPC ......................... 725/46, 39, 40, 58, 110, 139
See application file for complete search history.

(56) References Cited

U.S. PATENT DOCUMENTS

| | | | |
|---|---|---|---|
| 5,758,257 A | 5/1998 | Herz | |
| 5,805,763 A * | 9/1998 | Lawler | H04N 5/44543 348/E5.105 |

(Continued)

FOREIGN PATENT DOCUMENTS

CA 2591385 A1 12/2007

*Primary Examiner* — Brian T Pendleton
*Assistant Examiner* — Alan H Luong
(74) *Attorney, Agent, or Firm* — Guntin & Gust, PLC; Robert Gingher

(57) ABSTRACT

A system that incorporates teachings of the present disclosure may include, for example, a set-top box having a controller to establish a user profile, retrieve from a media communication system media content schedules according to the user profile, determine a consumption status for each of the retrieved media content schedules, generate an Electronic Programming Guide (EPG) comprising the retrieved media content schedules, each media content schedule depicting its corresponding consumption status, and present the EPG at a media presentation device upon request. Other embodiments are disclosed.

20 Claims, 8 Drawing Sheets

(51) Int. Cl.
*H04N 7/173* (2011.01)
*H04N 21/25* (2011.01)
*H04N 21/258* (2011.01)
*H04N 21/262* (2011.01)
*H04N 21/4147* (2011.01)
*H04N 21/466* (2011.01)
*H04N 21/84* (2011.01)

(56) References Cited

U.S. PATENT DOCUMENTS

| | | | |
|---|---|---|---|
| 6,532,589 B1 | 3/2003 | Proehl et al. | |
| 7,188,355 B1 | 3/2007 | Prokopenko et al. | |
| 7,418,672 B2 | 8/2008 | Stautner et al. | |
| 8,782,698 B2 | 7/2014 | Gossweiler et al. | |
| 8,839,300 B2 | 9/2014 | White | |
| 9,338,407 B2* | 5/2016 | Malik | H04N 5/44543 |
| 2002/0083451 A1* | 6/2002 | Gill | H04N 7/165 |
| | | | 725/46 |
| 2002/0188947 A1* | 12/2002 | Wang | H04N 5/44543 |
| | | | 725/45 |
| 2003/0084450 A1 | 5/2003 | Thurston et al. | |
| 2003/0110492 A1 | 6/2003 | Thurston et al. | |
| 2003/0135855 A1 | 7/2003 | Faihe et al. | |
| 2003/0237093 A1* | 12/2003 | Marsh | G06F 3/0481 |
| | | | 725/46 |
| 2004/0028375 A1* | 2/2004 | Kim | G11B 19/025 |
| | | | 386/230 |
| 2004/0060063 A1* | 3/2004 | Russ | G11B 27/105 |
| | | | 725/46 |
| 2004/0117357 A1 | 6/2004 | Schirmer et al. | |
| 2004/0148347 A1 | 7/2004 | Appelman et al. | |
| 2005/0149987 A1* | 7/2005 | Boccon-Gibod | H04N 5/782 |
| | | | 725/135 |
| 2005/0160452 A1* | 7/2005 | Lawler | H04N 5/44543 |
| | | | 725/38 |
| 2005/0193414 A1* | 9/2005 | Horvitz | H04N 21/482 |
| | | | 725/46 |
| 2005/0212504 A1 | 9/2005 | Revital et al. | |
| 2005/0216940 A1 | 9/2005 | Black | |
| 2006/0150216 A1* | 7/2006 | Herz | G06Q 20/383 |
| | | | 725/50 |
| 2007/0005629 A1 | 1/2007 | Tokuda et al. | |
| 2007/0094292 A1 | 4/2007 | Kataoka et al. | |
| 2007/0130595 A1 | 6/2007 | McElhatten et al. | |
| 2007/0157247 A1* | 7/2007 | Cordray | G06F 3/0481 |
| | | | 725/47 |
| 2007/0211158 A1* | 9/2007 | Icho | H04N 5/44543 |
| | | | 348/333.02 |
| 2008/0209474 A1* | 8/2008 | Pjanovic | H04N 5/44543 |
| | | | 725/46 |
| 2008/0216107 A1* | 9/2008 | Downey | H04N 7/17318 |
| | | | 725/22 |
| 2009/0100478 A1* | 4/2009 | Craner | G11B 19/00 |
| | | | 725/87 |
| 2009/0165049 A1 | 6/2009 | Sekiguchi | |
| 2009/0249429 A1* | 10/2009 | Sullivan | H04N 7/17318 |
| | | | 725/133 |
| 2009/0293090 A1* | 11/2009 | Quigley | H04N 7/17318 |
| | | | 725/62 |
| 2010/0017824 A1 | 1/2010 | Malik | |
| 2016/0227290 A1* | 8/2016 | Malik | H04N 5/44543 |

* cited by examiner

100

400

Profile Setup

Select Genres of interest

☐ Comedy   ☐ Romance   ☐ News

☐ Drama    ☐ Action    ☐ Sports

•
•
•

Select Channels of interest

[ CH XX ▼ ]   [ Add ]

Select Shows of interest

[ Genre ▼ ]   [ Shows ▼ ]   [ Add ]

Select Performers of interest

[ Performers ▼ ]   [ Add ]

Select Producers/Directors of interest

[ Prod/Dir ▼ ]   [ Add ]

APPARATUS AND METHOD FOR PRESENTING AN ELECTRONIC PROGRAMMING GUIDE

CROSS-REFERENCE TO RELATED APPLICATIONS

This application is a continuation of U.S. application Ser. No. 12/174,927, filed Jul. 17, 2008, which is incorporated herein by reference in its entirety.

FIELD OF THE DISCLOSURE

The present disclosure relates generally to Electronic Programming Guides (EPGs) and more specifically to an apparatus and method for presenting an EPG.

BACKGROUND

Electronic programming guides are useful tools for guiding subscribers in selecting from a large suite of media content. Common sources of media content include without limitation on-line radio programs, and television (TV) programs supplied by media communication systems such as satellite TV, cable TV, and Internet Protocol TV.

BRIEF DESCRIPTION OF THE DRAWINGS

FIGS. 6-7 depict illustrative embodiments of the method of FIG. 5; and

DETAILED DESCRIPTION

One embodiment of the present disclosure entails a Set-Top Box having a controller to establish a user profile, retrieve from a media communication system media content schedules according to the user profile, determine a consumption status for each of the retrieved media content schedules, generate an Electronic Programming Guide (EPG) comprising the retrieved media content schedules, each media content schedule depicting its corresponding consumption status, and present the EPG at a media presentation device upon request.

Another embodiment of the present disclosure entails a method involving assembling an EPG from media content schedules retrieved from a media communication system according to a user profile, wherein at least one the media content schedules depicts a consumption status of media content associated therewith.

Yet another embodiment of the present disclosure entails a computer-readable storage medium having computer instructions for generating an EPG including a plurality of media content schedules selected according to a profile, and a consumption status depicted in at least each of a portion of the plurality of media content schedules.

Figure 1:
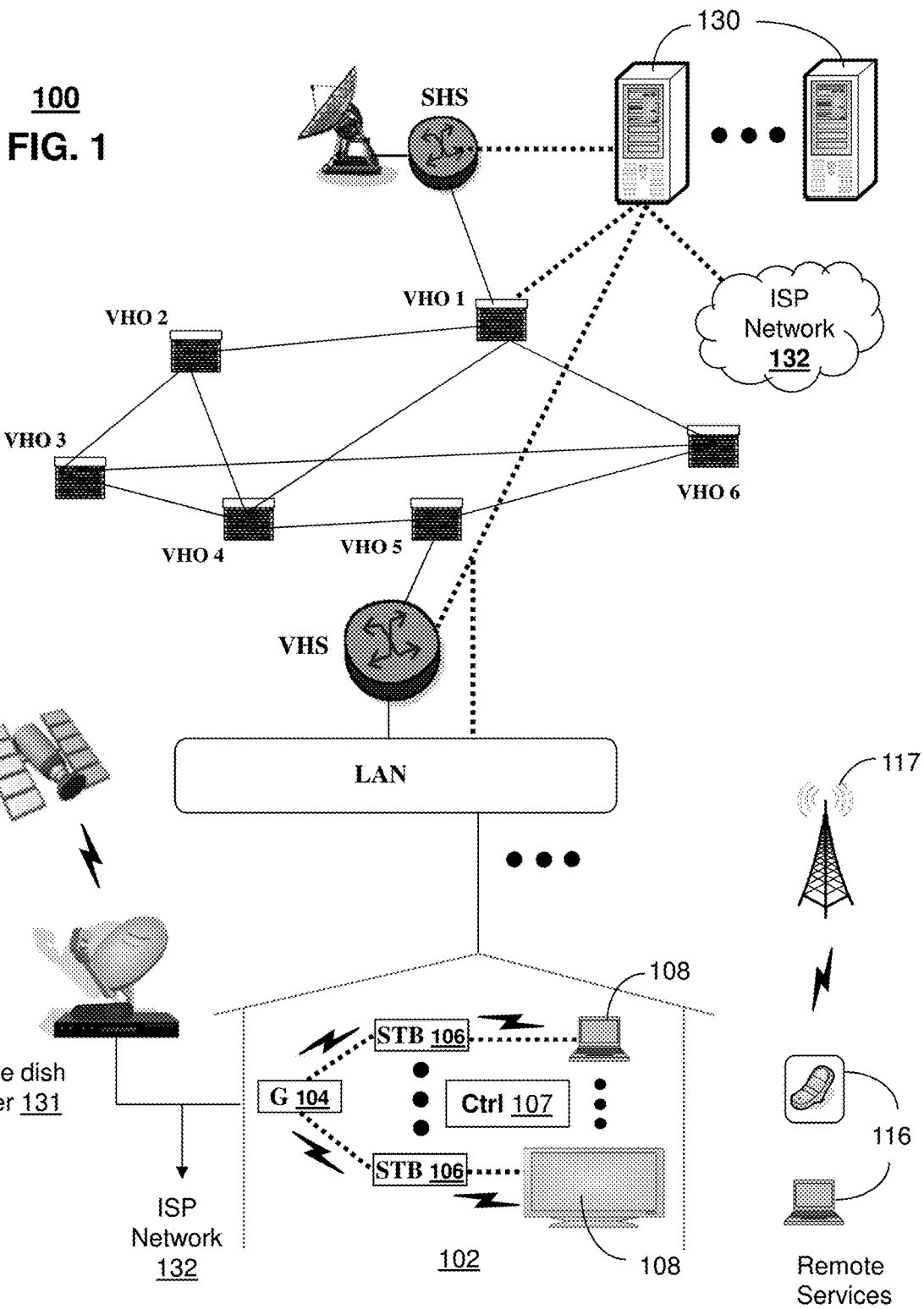
FIGS. 1-3 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as an electronic programming guide (EPG) system 130 for presenting media content schedules to subscribers of the first communication system 100.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
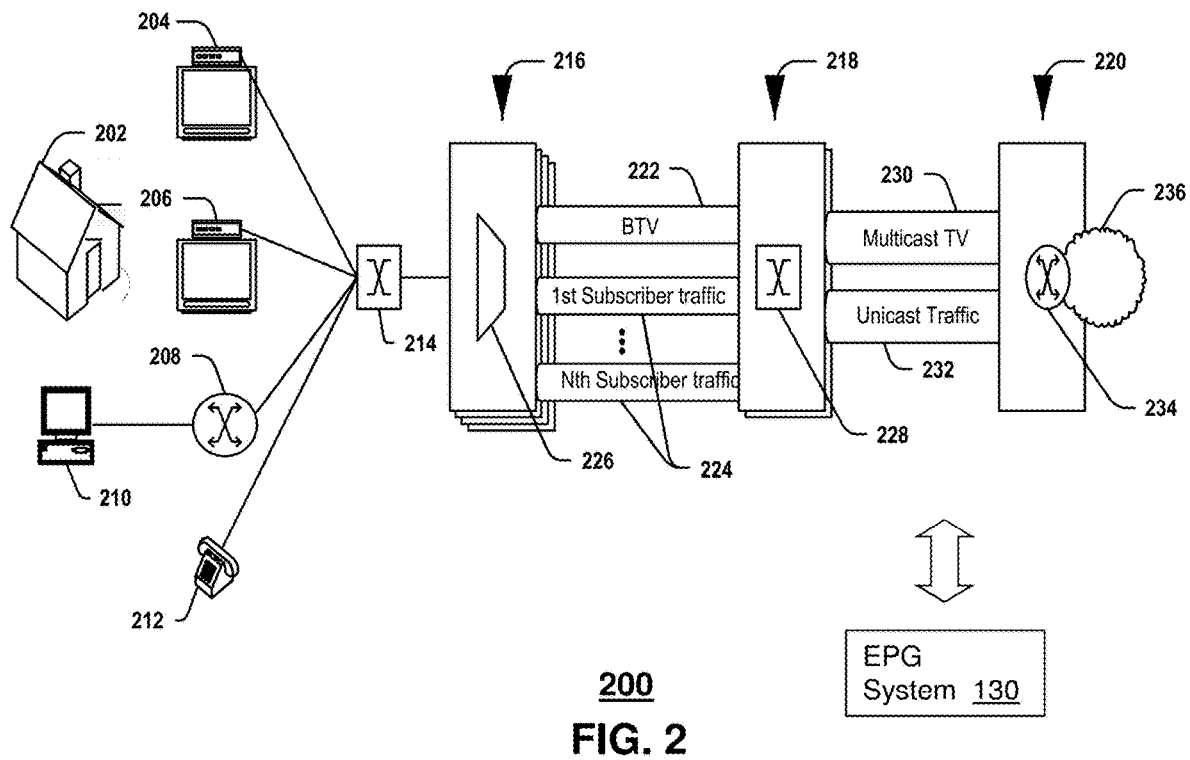

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The EPG system 130 of FIG. 1 can be operably coupled to the second communication system 200 for purposes similar to those described above.

Figure 3:
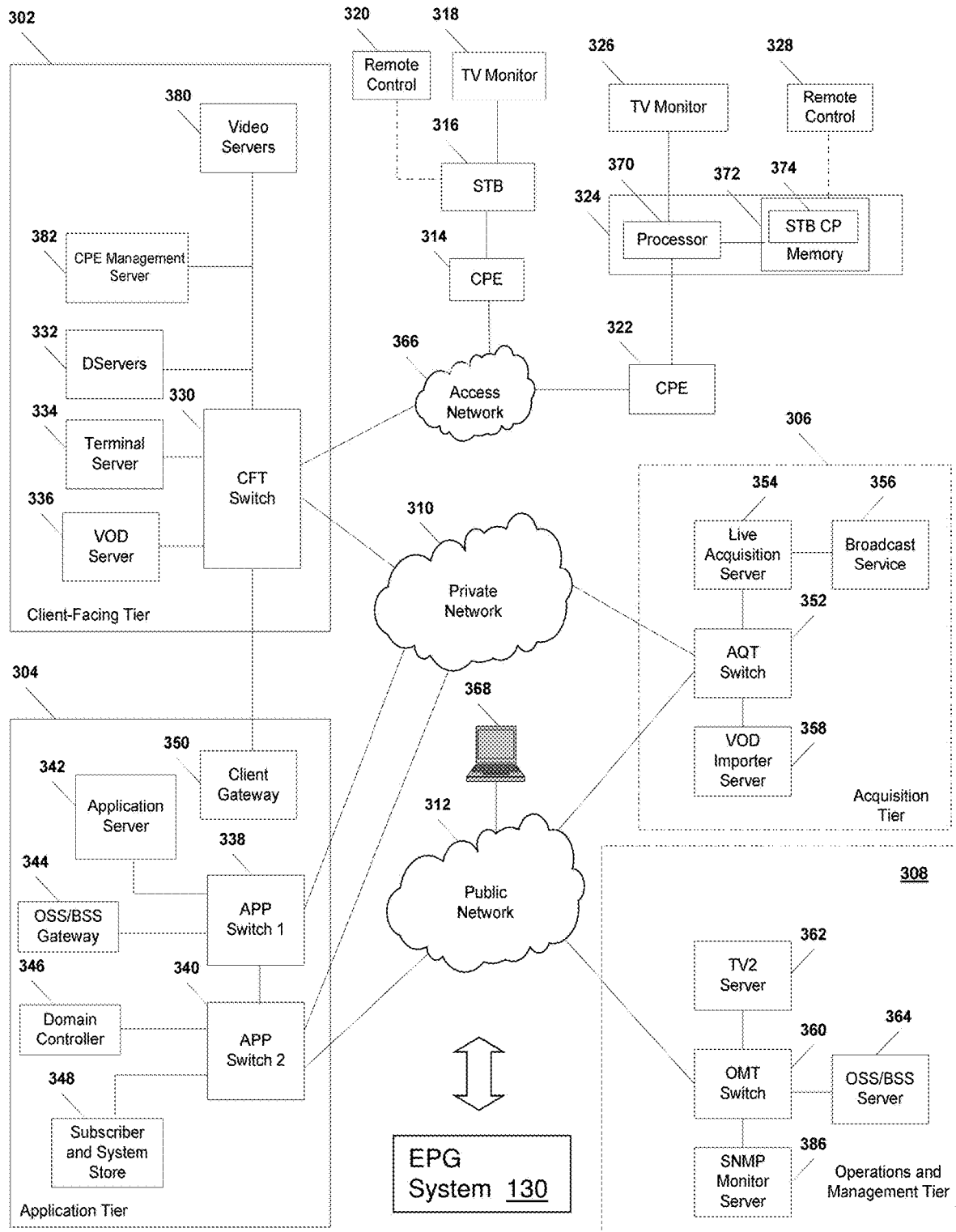

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The EPG system 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
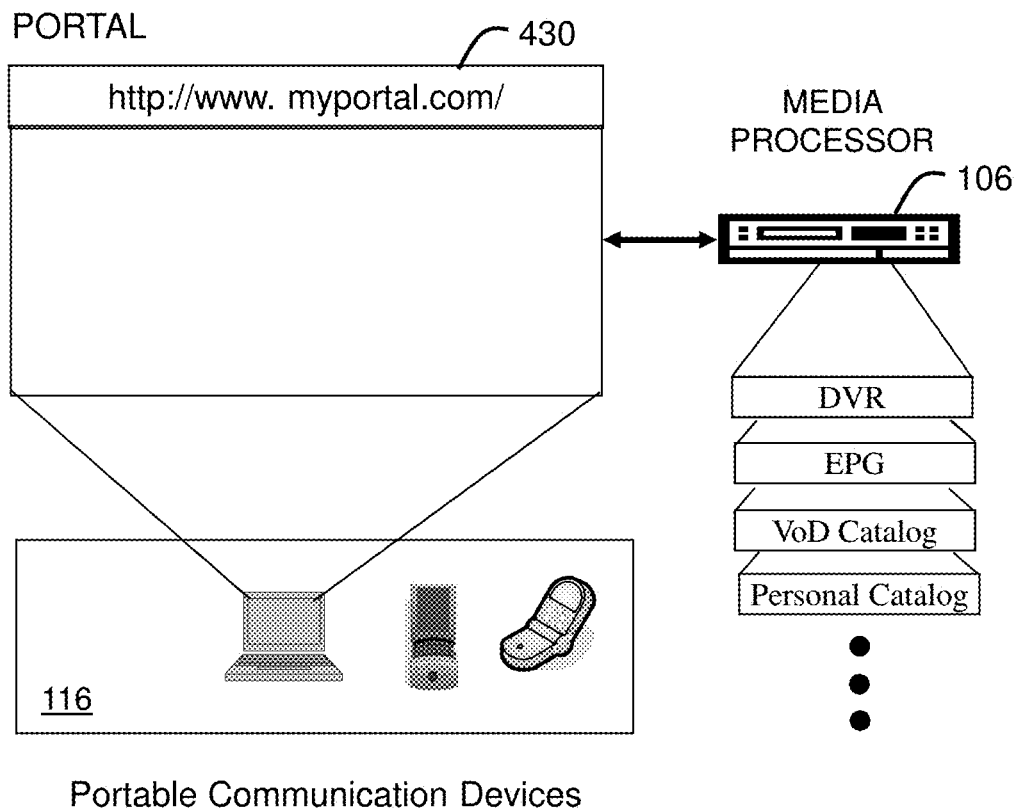
FIG. 4 depicts an illustrative embodiment of a portal interacting with at least one among the communication systems of FIGS. 1-3.

FIG. 4 depicts an illustrative embodiment of a portal 430. The portal 430 can be used for managing services of communication systems 100-300. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 5:
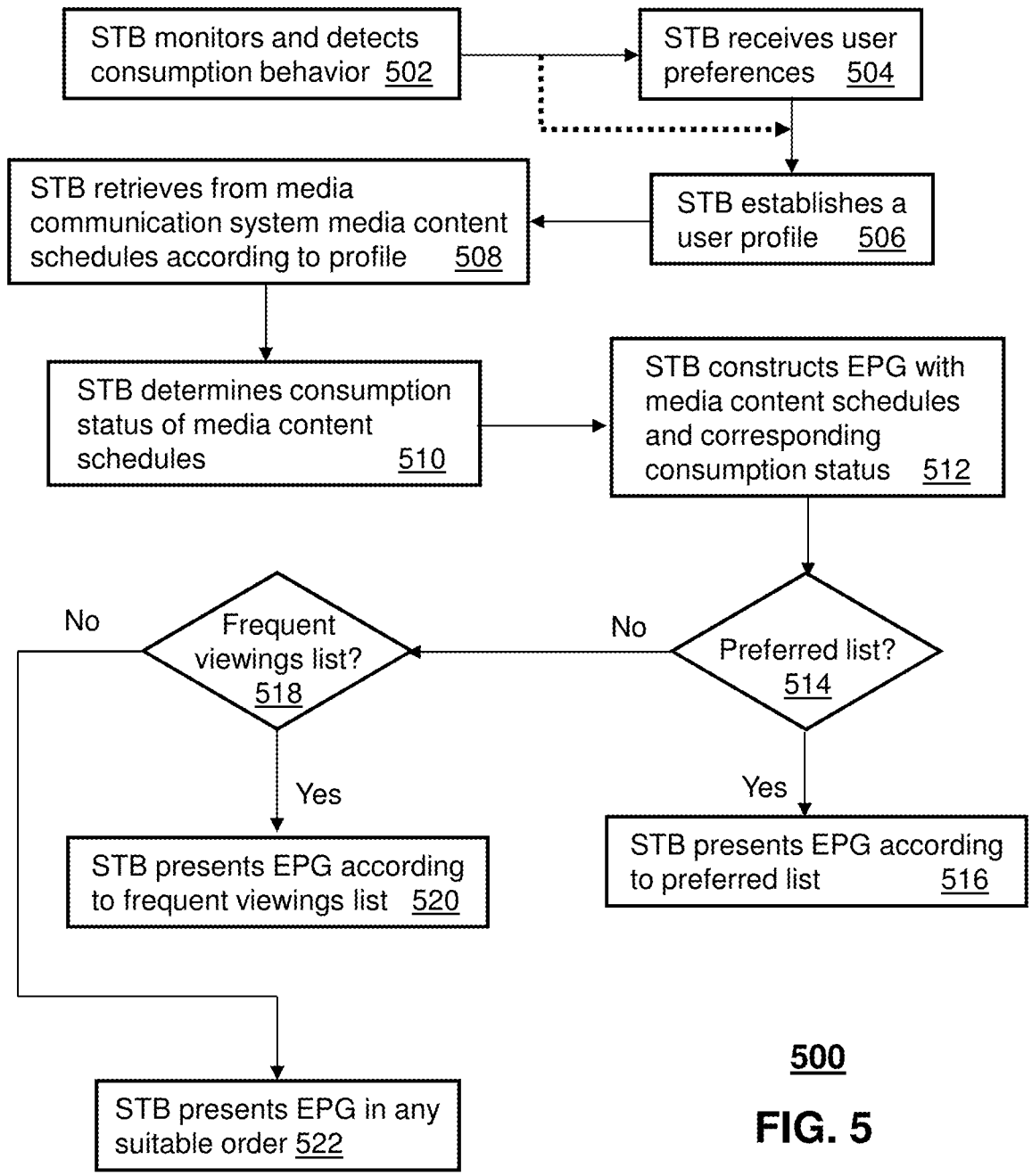
FIG. 5 depicts an illustrative method operating in portions of the communication systems of FIGS. 1-4.
Figure 7:
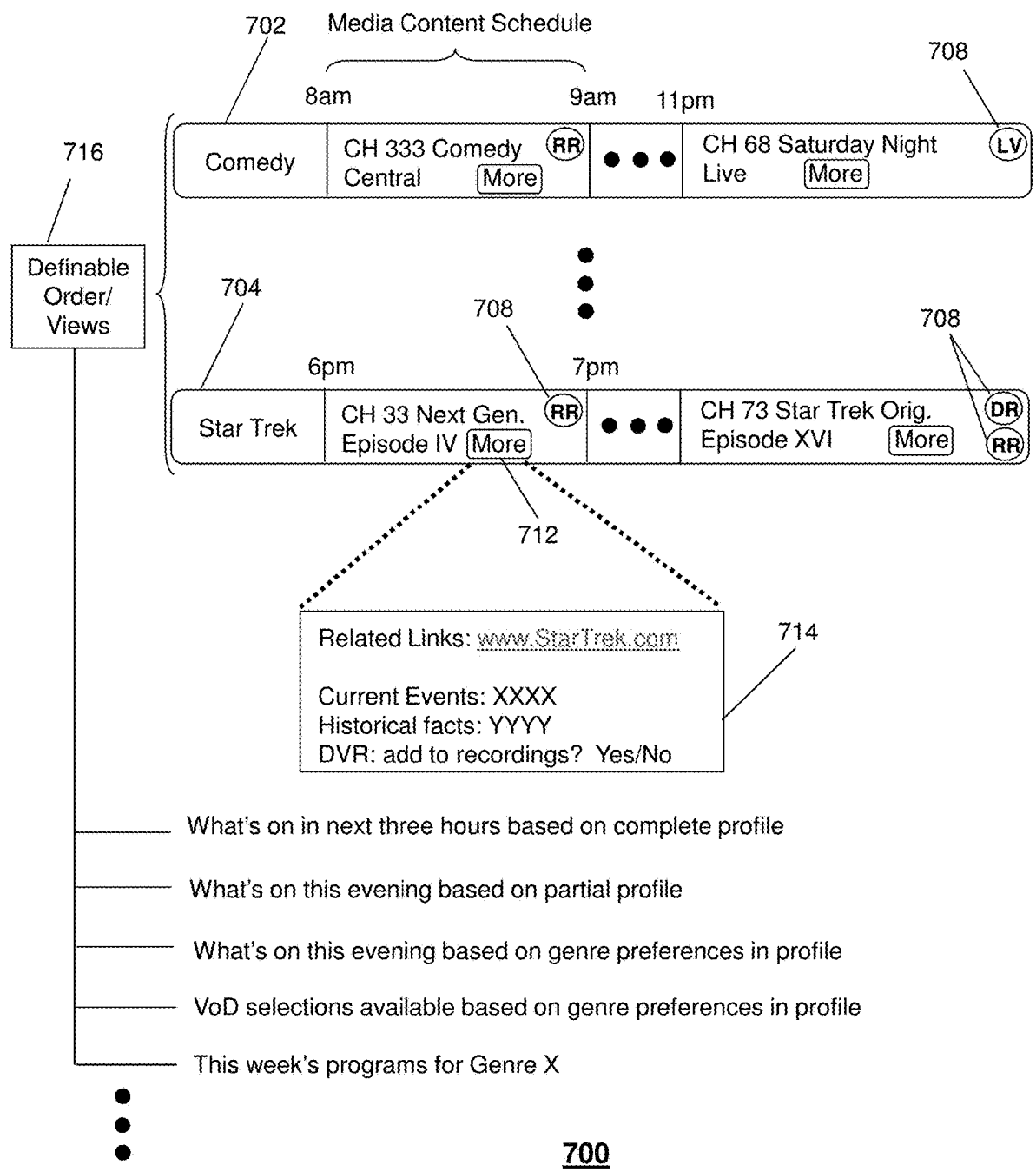

FIG. 5 depicts an illustrative method 500 operating in portions of communication systems 100-300. FIGS. 6-7 depict illustrative embodiments of method 500. Method 500 begins with step 502 in which a media processor such as an STB of FIGS. 1-3 monitors and detects consumption behaviors of a user of the STB. Alternatively, or in combination, the STB can receive from the user of the STB user preferences for media content. These preferences can include for example preferences for particular media programs (e.g., Star Trek, 48 Hours, Radio programs of interest, etc.), preferences for media programs by genre (Comedy, Family-oriented), content ratings such as G, PG, PG-13, etc., or other suitable preferences such as artists, directors, producers, and so on. Other user-defined preferences that can assist the STB in identifying the likes and/or dislikes of the user can be applied to the present disclosure. Since it can be a daunting tasks to define all forms of preferences, the behavioral information collected in step 502 can be combined with the preferences supplied in step 504 to form a comprehensive user profile in step 506.

In accordance with the user profile, the STB can retrieve in step 508 media content schedules from one or more databases operating in EPG system 130 of the aforementioned media communication systems of FIGS. 1-3. These databases can comprise a comprehensive list of media content schedules for all media program channels offered by the media communication system. Rather than download an entire database, the STB can sift through the database for media programs that match the user profile. The media content schedules selected in step 508 can for example identify presentation schedules for the media programs that match the user profile, as well as other details (e.g., channel number on the STB, website(s) with related information, etc.).

In step 510 the STB can further determine a consumption status of the media content schedules. A consumption status can indicate a state of consumption of a media program for a select schedule. For example, a select media content schedule can indicate that a media program associated with the schedule is a rerun. That is, the media program has been presented on prior occasions and is therefore not a first-time presentation. The select media content schedule can also indicate that a DVR coupled to or integrated with the STB is programmed to record the media program at the scheduled presentation time. The consumption status can be retrieved from the databases of the EPG system 130 as well as from a DVR coupled to or an integral part of the STB.

Once the consumption status has been determined, the STB constructs in step 512 a customized EPG for the user (or users) of the STB which includes media content schedules, each with a corresponding consumption status. Prior to presenting the EPG requested by a user, the STB can be programmed in step 514 to determine whether the user profile has provided a preferred list of media content. A preferred list can be useful when the EPG is organized by rows, each row representing a particular media program, genre, or other category of interest, and the number of rows is greater than the viewing area of a media presentation device such as a computer monitor, television screen, phone screen, and so on. The EPG can be presented in step 516 according to a preferred list consisting of for example the top ten media programs, genres, or other category of interest of the user.

If a preferred list is not requested, the STB can determine in step 518 whether the user profile directs the STB to organize media schedules according to the most frequently viewed schedules. If such a request is made, the STB can present in step 520 the EPG showing media schedules according to a frequency of viewings of the schedules based on for example the most frequently viewed schedule first, the least frequently viewed schedule last, and others in between ordered according to their respective frequency of viewings. The STB can periodically update the organization of the media content schedules as the average frequency of viewings change. If neither a preferred list or frequency of viewings list is identified in the user profile, the STB can proceed to step 522 and present the EPG in any suitable order (e.g., alphabetical, by genre, etc.).

FIG. 6 presents an illustrative embodiment for establishing a profile according to method 500. In this illustration, an STB can present a user a GUI with a number of prompts to assist the user in defining his/her preferences. For instance, the user can be asked to select genres of interest for all available programs. A user can also define channels of interest by selecting channels from a drop-down menu (or by entering channel numbers) and adding each channel to a preference list stored by the STB. The user can also select shows of interest by first selecting a genre and selecting shows associated with the genre. Each show selected can be added to a preference list of shows stored by the STB. Additionally, the user can select performers of interest and/or producers and directors of interest, which singly or in combination can generate preference lists as well. The user profile illustrated can be much more comprehensive than what is shown in FIG. 6. Moreover, the user profile can generate additional windows or GUIs based on a nested selection of preferences by the user. The user profile preferences entered manually by the user can also be enhanced by pattern recognition preferences detected by the STB.

FIG. 7 presents an illustrative embodiment of a customized EPG resulting from the steps of method 500. In this illustration, an EPG is presented in rows, each row identified by a genre 702, media program 704, or other identifiable category such as for example artists, directors, producers, and so on, which the user profile identifies as a category of interest to the user. Each media content schedule can include a schedule, a number of selectable items such a channel number, a "more" GUI button 712, and symbol(s) 708 indicating a consumption status. Consumption status is illustrated in FIG. 7 by text symbols (e.g., LV for live presentation, RR for re-run presentation, DR for digital media recording, and so on). The symbol DR can be selected to invoked a menu from a DVR coupled to or integral to the STB. Thus a user can control and/or reprogram a DVR setting by way of selecting a consumption status symbol of the EPG. Additionally, a media content schedule can have more than one consumption status (see Star Trek Orig. Episode XVI).

Upon selecting the More GUI button 712, the STB can present a GUI 714 with related links for the media program, current events, historical facts, and/or an option to add the media program to the DVR recording schedule. As noted earlier, the EPG can be organized by any definable view, category or order (genre, artists, media program, etc.), each row including selectable media content schedules (with selectable sub-elements) of the category of interest.

For example, a user can request a view of the EPG that shows programming for the next three hours based on all aspects of the user's profile. In another illustrative embodiment, the user can request programming for the evening based on partial preferences listed in the profile. In yet another viewing, a user can request programming for the evening based on genre preferences. The user can also request a viewing of VoD selections based on genre preference in the profile. In yet another illustrative embodiment, the user can request programs for a calendar period such as a week for a select genre (X). Viewing formats and/or the order of presenting media program schedules can be defined by the user in the profile, and/or can be offered by the STB as selectable viewing formats in drop-down menus.

Upon reviewing the aforementioned embodiments, it would be evident to an artisan with ordinary skill in the art that said embodiments can be modified, reduced, or enhanced without departing from the scope and spirit of the claims described below. For example, method 500 can be adapted so that the aforementioned steps occur at the EPG system 130 in whole or in part for at least a portion of STB subscribers. This option can be useful for subscribers who do not have an STB that has the sophistication described above. Accordingly, a service provider of the aforementioned media communication systems can have some subscribers with STBs that perform some or all of the functions of method 500, while other subscribers procure the services of EPG system 130 to perform these functions remotely.

Other suitable modifications can be applied to the present disclosure without departing from the scope of the claims below. Accordingly, the reader is directed to the claims section for a fuller understanding of the breadth and scope of the present disclosure.

Figure 8:
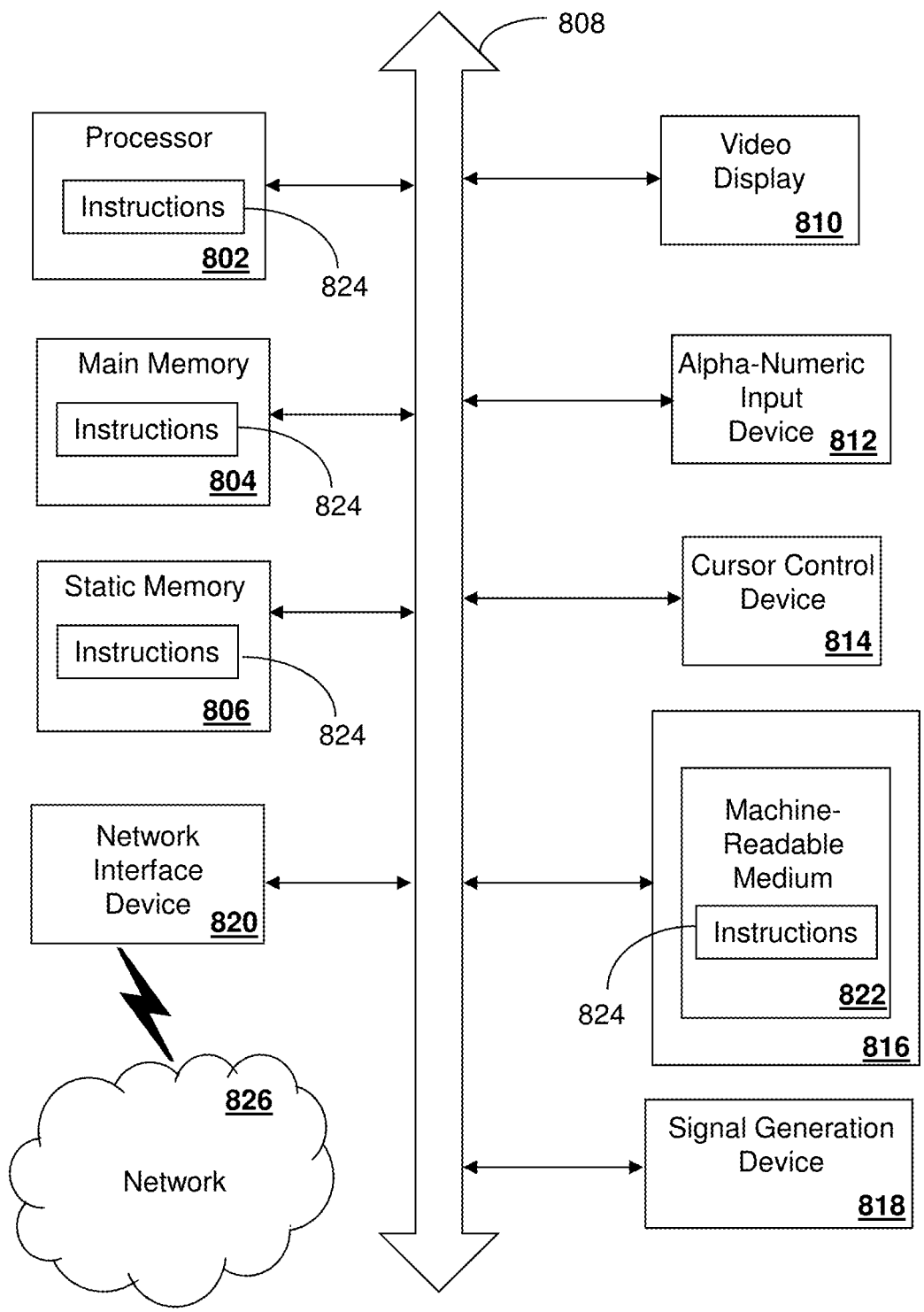
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    monitoring, by a media processor comprising a controller, media content consumption behavior of a user of the media processor;
    generating, by the media processor, a user profile in accordance with the media content consumption behavior, wherein the user profile comprises a plurality of preferences;
    obtaining, by the media processor, a request for future media content at a future time period specified by the user;
    receiving an electronic programming guide that contains the future media content, and wherein the future media content is selected based on a plurality of preferences contained within the user profile for the future time period;
    retrieving, by the media processor from a media communication system, media content schedules according to the user profile and the future time period, wherein the media content schedules that are retrieved are based upon a subset of the plurality of preferences that are selected in accordance with the future time period;
    determining, by the media processor, a consumption status for each media content in the media content schedules that are retrieved;
    determining, by the media processor, whether the user profile includes a preferred list of media content specified by the user, wherein the preferred list comprises top programs, genres, or other category of interest of the user;
    responsive to a determination that the user profile includes the preferred list of media content, presenting, by the media processor, the electronic programming guide including the media content schedules organized according to the preferred list;
    responsive to a determination that the user profile does not include the preferred list of media content, presenting, by the media processor, the electronic programming guide including the media content schedules organized according to a list of frequently viewed programs derived from the user profile;
    receiving, by the media processor, a selection of a first selectable item provided in a first media content schedule of the electronic programming guide, wherein the first selectable item provides an indication of the consumption status of a media program associated with the first selectable item; and
    presenting, by the media processor and responsive to the selection, a menu for controlling a recording device for recording the media program, wherein the recording device is coupled to the media processor.

2. The method of claim 1, wherein the first media content schedule including the first selectable item further includes a second selectable item, the method further comprising:
    presenting, by the media processor, responsive to selection of the second selectable item, a graphical user interface for displaying additional information associated with the media program.

3. The method of claim 2, wherein the graphical user interface includes a link related to the media program.

4. The method of claim 2, wherein the graphical user interface includes an option to add the media program to a recording schedule of the recording device.

5. The method of claim 1, wherein the monitoring comprises monitoring user requests for media program presentations, and wherein the generating comprises detecting a pattern in the user requests.

6. The method of claim 1, wherein the consumption status corresponds to a rerun of the media program, a new episode of the media program, a live presentation of the media program, or an indication that the media program is being recorded or is scheduled to be recorded by the recording device.

7. The method of claim 1, wherein the first selectable item comprises an identifier, an iconic symbol or a color-coded scheme.

8. The method of claim 1, wherein a second media content schedules presents content sources associated with the media content schedules.

9. The method of claim 8, wherein the content sources comprise a fan club of media content, a description of current events associated with media content, or a blog website associated with media content.

10. A device, comprising:
a processing system including a processor; and
a memory storing executable instructions that, when executed by the processing system, perform operations comprising:
monitoring media content consumption behavior of a user of the device, wherein the monitoring comprises monitoring user requests for media program presentations;
detecting a pattern in the user requests, resulting in a detected pattern;
generating a user profile in accordance with the detected pattern, wherein the user profile comprises a plurality of preferences;
obtaining a request for future media content at a future time period specified by the user for an electronic programming guide that contains the future media content, wherein the future media content is selected based on a plurality of preferences contained within the user profile for the future time period;
retrieving, from a media communication system, media content schedules according to the user profile and the future time period, wherein the media content schedules that are retrieved are based upon a subset of the plurality of preferences that are selected in accordance with the future time period;
determining a consumption status for each of the media content in the media content schedules that are retrieved;
determining whether the user profile includes a preferred list of media content specified by the user, wherein the preferred list comprises top programs, genres, or other category of interest of the user;
responsive to a determination that the user profile includes the preferred list of media content, presenting the electronic programming guide including the media content schedules organized according to the preferred list, wherein one of the media content schedules presents content sources associated with the media content schedules;
responsive to a determination that the user profile does not include the preferred list of media content, presenting the electronic programming guide including the media content schedules organized according to a list of frequently viewed programs derived from the user profile;
receiving a selection of a first selectable item provided in a first media content schedule of the electronic programming guide, wherein the first selectable item provides an indication of the consumption status of a media program associated therewith; and
presenting, responsive to selection of the first selectable item, a menu for controlling a recorder for recording the media program.

11. The device of claim 10, wherein the recorder is integral to the device.

12. The device of claim 10, wherein the first media content schedule including the first selectable item further includes a second selectable item, and wherein the operations further comprise:
presenting, responsive to selection of the second selectable item, a graphical user interface for displaying additional information associated with the media program.

13. The device of claim 12, wherein the graphical user interface includes an option to add the media program to a recording schedule of the recorder.

14. The device of claim 10, wherein a second media content schedules presents content sources associated with the media content schedules.

15. A non-transitory machine-readable storage medium, comprising executable instructions that, when executed by a processing system including a processor, perform operations comprising:
monitoring media content consumption behavior of a user, wherein the monitoring comprises monitoring user requests for media program presentations;
detecting a pattern in the user requests, resulting in a detected pattern;
generating a user profile in accordance with the detected pattern, wherein the user profile comprises a plurality of preferences;
obtaining a request for future media content at a future time period specified by the user and to generate an electronic programming guide that contains the future media content, wherein the future media content is selected based on a plurality of preferences contained within the user profile;
retrieving media content schedules from a media communication system according to the user profile and the future time period, wherein the media content schedules that are retrieved are based upon a subset of the plurality of preferences that are selected in accordance with the future time period;
determining a consumption status for each media content in the media content schedules that are retrieved;
determining whether the user profile includes a preferred list of media content specified by the user, wherein the preferred list comprises top programs, genres, or other category of interest of the user;
responsive to a determination that the user profile includes the preferred list of media content, presenting the electronic programming guide including the media content schedules organized according to the preferred list;
responsive to a determination that the user profile does not include the preferred list of media content, presenting the electronic programming guide including the media content schedules organized according to a list of frequently viewed programs derived from the user profile;
receiving a selection of a first selectable item provided in a first media content schedule of the electronic programming guide, wherein the first selectable item provides an indication of the consumption status of a media program associated therewith; and
presenting, responsive to the selection, a menu for controlling a recording device for recording the media program.

16. The non-transitory machine-readable storage medium of claim 15, wherein the first media content schedule including the first selectable item further includes a second selectable item, and wherein the operations further comprise:
presenting, responsive to selection of the second selectable item, a graphical user interface for displaying additional information associated with the media program.

17. The non-transitory machine-readable storage medium of claim 16, wherein the graphical user interface includes an option to add the media program to a recording schedule of the recording device.

18. The device of claim 10, wherein the processing system comprises a plurality of processors operating in a distributed processing environment.

19. The non-transitory machine-readable storage medium of claim 15, wherein the processing system comprises a plurality of processors operating in a distributed processing environment.

20. The non-transitory machine-readable storage medium of claim 15, wherein the operations further comprise periodically updating an organization of the media content schedules as an average frequency of viewings change.

* * * * *